(12) United States Patent
Rogers et al.

(10) Patent No.: US 11,857,880 B2
(45) Date of Patent: Jan. 2, 2024

(54) SYSTEMS FOR GENERATING UNIQUE NON-LOOPING SOUND STREAMS FROM AUDIO CLIPS AND AUDIO TRACKS

(71) Applicant: SYNAPTICATS, INC., Portland, OR (US)

(72) Inventors: Erik Rogers, Portland, OR (US); Mark Rogers, Portland, OR (US)

(73) Assignee: SYNAPTICATS, INC., Portland, OR (US)

( * ) Notice: Subject to any disclaimer, the term of this patent is extended or adjusted under 35 U.S.C. 154(b) by 216 days.

(21) Appl. No.: 17/116,273

(22) Filed: Dec. 9, 2020

(65) Prior Publication Data

US 2021/0178268 A1 Jun. 17, 2021

Related U.S. Application Data

(60) Provisional application No. 62/946,619, filed on Dec. 11, 2019.

(51) Int. Cl.
*G06F 3/16* (2006.01)
*A63F 13/54* (2014.01)

(52) U.S. Cl.
CPC .............. *A63F 13/54* (2014.09); *G06F 3/165* (2013.01)

(58) Field of Classification Search
CPC ................................ A63F 13/54; G06F 3/165
See application file for complete search history.

(56) References Cited

U.S. PATENT DOCUMENTS

| | | | |
|---|---|---|---|
| 5,420,934 A | 5/1995 | Okamoto | |
| 5,619,179 A | 4/1997 | Smith | |
| 5,633,985 A | 5/1997 | Severson et al. | |
| 5,754,094 A | 5/1998 | Frushour | |
| 5,832,431 A | 11/1998 | Severson et al. | |
| 5,867,580 A | 2/1999 | Anderson et al. | |
| 6,230,140 B1 | 5/2001 | Severson et al. | |
| 6,359,549 B1 | 3/2002 | Lau et al. | |
| 6,822,153 B2 | 11/2004 | Comair et al. | |
| 7,310,604 B1 | 12/2007 | Cascone et al. | |
| 7,330,769 B2 * | 2/2008 | Comair ................... | A63F 13/10 381/61 |
| 7,749,155 B1 | 7/2010 | Anderson et al. | |
| 9,421,474 B2 | 8/2016 | Derby, Jr. | |
| 9,602,938 B2 | 3/2017 | Goldstein et al. | |
| 9,648,436 B2 | 5/2017 | Kraft et al. | |
| 9,978,358 B2 | 5/2018 | Morishima | |

(Continued)

*Primary Examiner* — Werner G Garner
(74) *Attorney, Agent, or Firm* — David R. Heckadon; Gordon Rees Scully Mansukhani LLP

(57) ABSTRACT

A method of mixing audio segments from audio clips to generate a unique stream of non-repeating sound, by: (a) inputting a plurality of audio source clips into an audio system; (b) applying a transfer function system to the plurality of audio source clips to select audio segments of the plurality of audio source clips, or applying a scheduling function system to the plurality of audio source clips to select playback times for the plurality of audio source clips; (c) applying a timeline renderer system to arrange the order of the selected audio segments; (d) applying a track renderer system to generate a plurality of audio playback clip tracks; (e) cross-fading the selected audio segments, thereby generating an audio playback clip having a unique sound stream; and (f) playing the audio playback clip having the unique sound stream.

6 Claims, 3 Drawing Sheets

(56) References Cited

U.S. PATENT DOCUMENTS

| | | | |
|---|---|---|---|
| 10,361,673 | B1 | 7/2019 | Matsukawa |
| 2004/0110561 | A1 | 6/2004 | Kawamura |
| 2005/0281410 | A1 | 12/2005 | Grosvenor et al. |
| 2007/0110253 | A1 | 5/2007 | Anderson et al. |
| 2008/0165988 | A1 | 7/2008 | Terlizzi et al. |
| 2010/0142715 | A1 | 6/2010 | Goldstein et al. |
| 2013/0327009 | A1 | 12/2013 | McClure et al. |
| 2015/0373474 | A1 | 12/2015 | Kraft et al. |
| 2019/0020555 | A1* | 1/2019 | Tayal .................. G06N 3/02 |

* cited by examiner

SYSTEMS FOR GENERATING UNIQUE NON-LOOPING SOUND STREAMS FROM AUDIO CLIPS AND AUDIO TRACKS

RELATED APPLICATION

The present application claims priority to U.S. Provisional Patent Application Ser. No. 62/946,619, of same title filed Dec. 11, 2019, the entire disclosure of which is incorporated herein by reference in its entirety for all purposes.

TECHNICAL FIELD

The present application is related to systems for generating sound streams from audio clips and tracks.

BACKGROUND OF THE INVENTION

For relaxation and meditation, people often listen to recordings of ambient sounds. These recordings are typically of nature sounds such as sounds from a forest, a beach, a jungle, or a thunderstorm. A problem with listening to these recordings is that the listener becomes used to the order of the sounds (especially after playing the recordings over again and again).

What is instead desired is a system for generating an audio experience that does not rely on sounds that simply repeat over and over in the same order. Instead, a system for generating a unique stream of non-repeating sounds would be much more lifelike, and therefore much more desirable.

SUMMARY OF THE INVENTION

The present audio system is capable of generating an infinite stream of non-repeating sounds. The stream generated by the present audio system is itself preferably composed of audio segments of various lengths that are continuously arranged and re-arranged in different sequences for playback. These audio segments are cross-faded with one another to make the overall playback sound more seamless. Although the segments are chosen from the same finite source audio clips and therefore the sounds from the finite source audio clips will be repeated over time, the specific selections of segments in both timing and duration is continually varied, presenting the sensation that the sounds are not repeating and are more natural. In addition, the segments need not correspond directly to the static source clips, but rather are preferably dynamically selected (sub-segments) from the source clips, thereby further increasing the variety and realism of the output audio.

As a result, a user listening (for example) to a sound of a forest will hear the sounds of birds, but the birdcalls will appear at different (e.g.: random or non-regularly repeating) times. Similarly, for the sound of a thunderstorm, the individual rolls of thunder can be made to occur at different times. As a result, the thunderstorm's behavior is not predictable to the user (in spite of the fact that all of the individual sounds that make up the thunderstorm audio track may have been listened to before by the user). To the listener, there is no discernible repeating sound pattern over time. Instead, a continuous stream of non-repeating sounds is generated.

DETAILED DESCRIPTION OF THE DRAWINGS

Figure 1:
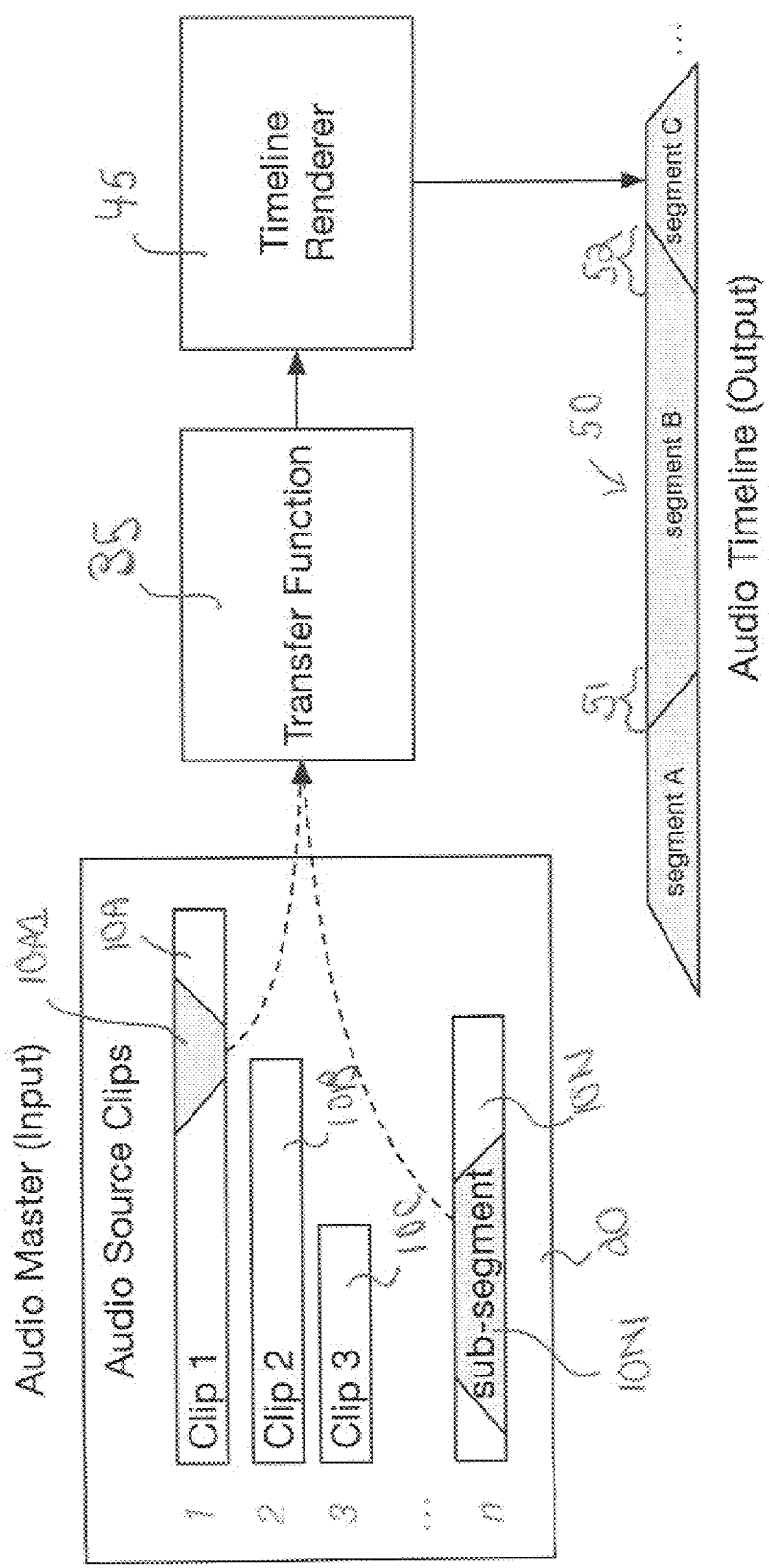
FIG. 1 is an illustration of a first arrangement of a sound sequence generated by the present audio system using a source clip selection system and a timeline renderer system.

FIG. 1 is an illustration of a first arrangement of a sound sequence generated by the present audio system using a source clip selection system and a timeline renderer system, as follows:

A number of different audio source clips 10A, 10B, 10C . . . 10N are first inputted into an audio master system 20. Next, a transfer function 35 is applied to the plurality of audio source clips 10A, 10B, 10C . . . 10N to select audio segments of the plurality of audio source clips 10A, 10B, 10C . . . 10N. For example, first segment $10A_1$ may be selected from audio source clip 10A and a second segment $10N_1$ may be selected from audio source clip 10N. Both of these selected segments ($10A_1$ and $10N_1$) can be operated on by transfer function 35.

Next, the timeline renderer system 45 applies a timeline rendering function to arrange the order of the selected audio segments $10A_1$, $10N_1$, etc. At this time, the selected audio segments are cross-faded as seen in Audio Timeline output 50 such that the transition from one selected segment to another (e.g.: segment A to segment B or segment B to segment C) is seamless and cannot be heard by the listener. The end result is that the present method of mixing audio segments from audio clips generates a unique stream of non-repeating sound which is then played back for the listener. (As illustrated, Segment A may correspond to audio source clip $10N_1$, Segment B may correspond to audio source clip $10A_1$, etc.)

As can be appreciated, from a finite set of audio clips of finite length (i.e.: 10A, 10B, etc.), an infinite stream of non-repeating sound can be created (in Audio Timeline Output 50). Although individual sounds can appear multiple times in the output, there will be no discernible repeating pattern over time in Audio Timeline Output 50.

As can be seen, the individual sound segments (10A1, 10N1, a.k.a. Segment A, Segment B, Segment C, etc.) are taken from selected audio clips (10A to 10N), and specifically from selected locations within the audio clips. In addition, the duration of the selected audio clips is preferably also selected by transfer function 35. In various examples, the transfer function 35 selects audio segments of unequal lengths. In various examples, the transfer function system 35 randomly selects the audio segments, and/or randomly selects the lengths of the audio segments.

In optional embodiments, the transfer function 35 may use a weighted function to select the audio segments. Alternatively, the transfer function 35 may use a heuristic function to select the audio segments. In preferred aspects, the transfer function 35 chooses the segments to achieve a desired level of uniqueness and consistency in sound playback.

In optional embodiments, the duration of the cross-fades 51 and 52 between the audio clips is unequal. The duration of the cross-fades 51 and 52 between the audio clips can even be random.

In various preferred aspects, the audio source clips are audio files or Internet URLs.

In preferred aspects, the transfer function system 35 continues to select audio segments and the timeline renderer 45 continues to arrange the order of the selected audio segments as the audio playback clip is played. Stated another way, a unique audio stream 50 can be continuously generated at the same time that it is played back for the listener. As a result, the unique audio stream 50 need not "end". Rather, new audio segments can be continuously added in new combinations to the playback sequence audio stream 50 while the user listens. As such, the playback length can be infinite.

The present system has specific benefits in relaxation and meditation since the human brain is very adept at recognizing repeating sound patterns. When a static audio loop is played repetitiously, it becomes familiar and is recognized by the conscious mind. This disrupts relaxing, meditation or even playing a game. In contrast, the audio of the present system can be play endlessly without repeating patterns which allows the mind to relax and become immersed in the sound.

Therefore, an advantage of the present system is that these large sound experiences can be produced from a much smaller number of audio clips and segments, thereby saving huge amounts of data storage space. With existing systems, very long sequences of audio must be captured without interruption. In contrast, with the present system, multiple, shorter audio clips can be used instead as input. This makes it much easier to capture sounds under non-ideal conditions.

Since the present audio playback stream is formed from endless combinations of shorter audio segments played over randomly or in various sequences, the present unique audio stream will have a length greater than the duration of the audio source clips. In fact, the present unique audio playback clip may well have infinite length.

Figure 2:
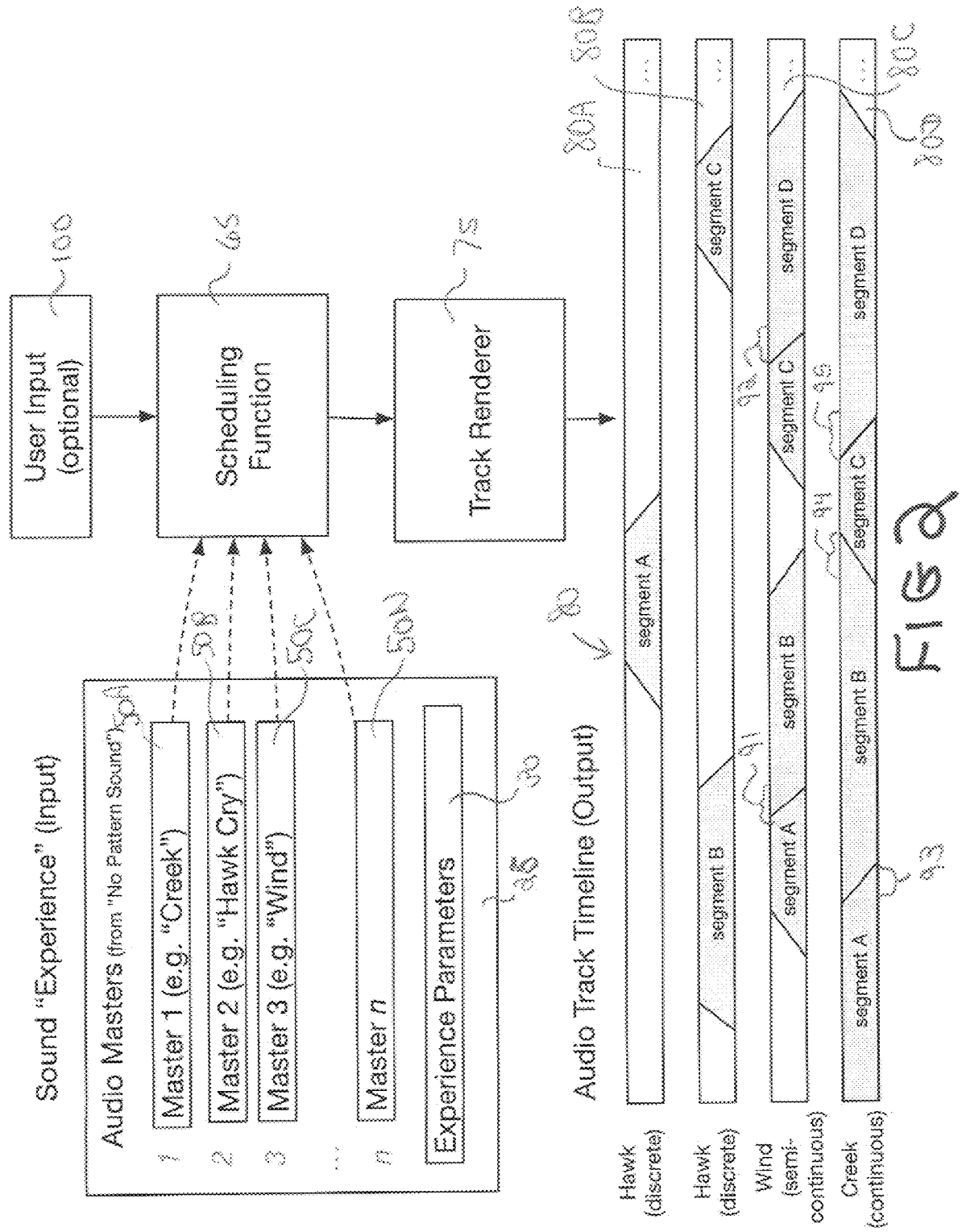
FIG. 2 is an illustration of a second arrangement of a sound sequence generated by the present audio system using a source clip scheduling system and an audio track rendering system.

FIG. 2 is an illustration of a second arrangement of a sound sequence generated by the present audio system using a source clip scheduling system and an audio track rendering system. In this embodiment, a plurality of audio master streams 50A, 50B, 50C . . . 50N, is again inputted into a sound experience system 25 (i.e.: "sound experience (input)"). Next, a scheduling function 65 is applied to the plurality of audio master streams to select playback times for the plurality of audio master streams 50A, 50B, 50C . . . 50N. Next, a track renderer 75 is applied to generate a plurality of audio playback clip tracks 80A, 80B, 80C, 80D, etc. Together, tracks 80A to 80N contain various combinations of scheduled discrete, semi-continuous, and continuous sounds that make up a "sonic experience" such as forest sounds (in this example two hawks, wind that comes and goes, and a continuously flowing creek). As such, audio master streams 50A to 50N are scheduled into a more layered experience of multiple sounds that occur over time, sometimes discretely (hawk cry) or continuously (creek), or a combination of both (wind that comes and goes). Scheduling function system 65 and track renderer 75 selectively fade tracks 80A to 80N in and out at different times. Accordingly, the listener hears a unique sound stream. In addition, experience parameters 30 determine various aspects of the scheduled output, including how many tracks 80 are outputted, and which tracks are outputted. In addition, experience parameters 30 determine how often discrete sounds are scheduled to play (for example, how often the Hawks cry from the example in FIG. 2, 80A and 80B), the relative volume of each sound, and other aspects. The experience parameter system 25 determine how often discrete sounds play, how often semi-discrete sounds fade out and for how long they are faded out and for how long they play.

In many ways, the system of FIG. 2 builds upon the previously discussed system of FIG. 1. For example, the sound segments (variously labelled A, B, C, D) that make up the individual tracks 80A, 80B, 80C and 80D are composed of the selections made by the Transfer Function 35 and Timeline Renderer 45 from the system of FIG. 1.

Optionally, in the aspect of the invention illustrated in FIG. 2, a user input system 100 can also be included. The user input system 100 controls the scheduling function system 65 such that a user can vary or modify the selection frequency of any of the audio master streams 50A, 50B . . . 50N. For example, Master Audio stream 50B can be a "Hawk Cry". Should the listener not wish to hear the sound of a hawk cry during the sound playback, the user can use the input control system to simply turn off or suspend the sound of the hawk cry (or make it occur less frequently), as desired. In this example, the user's control over the sound selection frequency forms part of the user's experience. The user is, in essence, building their own sound scape or listening environment. The very act of the user controlling the sounds can itself form part of a meditative or relaxation technique. As such, the user input system 100 optionally modifies or overrides the experience parameters system 30 that govern scheduling function 65 and track renderer 75.

As illustrated in FIG. 2, the listener hears an audio track 80 that combines two Hawks (80A and 80B), the Wind (80C) and the sound of a Creek (80A). As can be seen, the sound of the Creek is continuous in audio track 80D (with cross-fades 93, 94 and 95) between its various shorter sound segments A, B, C and D. The sound of the Wind (audio track 80C) is semi-continuous (as it would be in nature). The sounds of the hawk(s) (audio track 80B) are much more intermittent or discreet and may be sound segments that are faded in and out. In the semi-continuous or continuous mode, each potentially infinite audio master clip preferably plays continuously or semi-continuously.

In optional aspects, the scheduling function 65 randomly or heuristically selects playback times for the plurality of audio master streams 50A, 50B . . . etc. The tracks are assembled in time to produce the unique audio stream.

Similar to the system in FIG. 1, the scheduling function system 65 continues to select playback times for the plurality of audio master streams 50A, 50B . . . 50N and the track renderer 75 continues to generate a plurality of audio playback clip tracks (80A, 80B, 80C and 80D) as the audio playback clip track 80 is played. As such, the audio playback clip track 80 has the unique audio stream that may be of infinite length.

Figure 3:
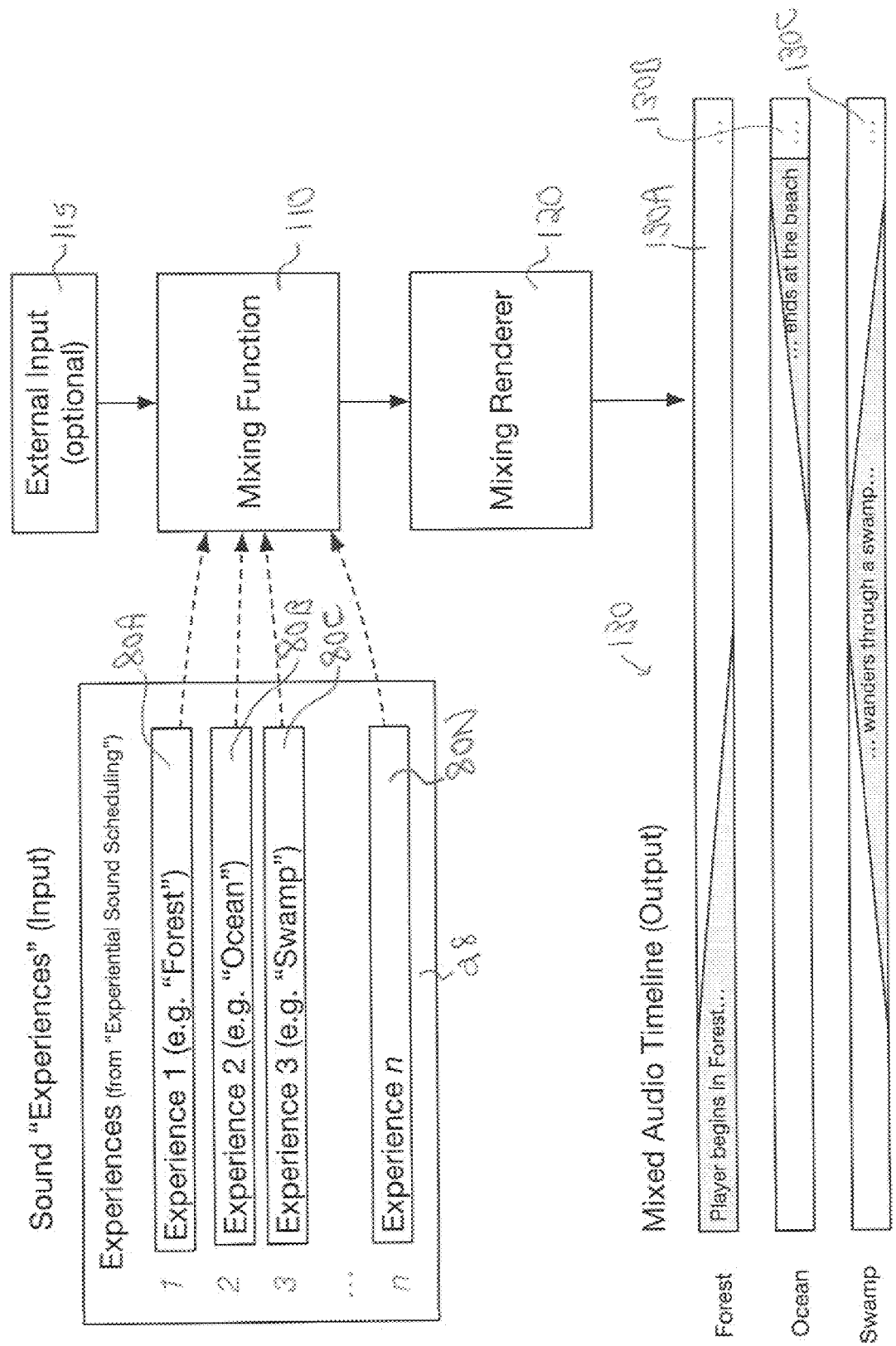
FIG. 3 is an illustration of a third arrangement of a sound sequence generated by the present audio system using a source clip mixing system and an audio track mixing system.

FIG. 3 is a third embodiment of the present system, as follows:

In this embodiment, a plurality of audio playback tracks 80A, 80B, 80C . . . 80N are inputted into an audio experiences system 28 (i.e.: "sound experiences (input)"). Next, a mixing function 110 is applied to the plurality of audio tracks 80A, 80B, 80C . . . 80N to select playback conditions for the plurality of audio tracks. A mixing renderer 120 is then applied to generate an audio playback clip 130 corresponding to the selected playback conditions.

Similar to the systems in FIGS. 1 and 2, the selected audio segments 130A, 130B and 130C (up to 130N) can be cross-faded. The final result is an audio playback clip track 130 having a unique sound stream that corresponds to the selected playback conditions which is then played back. A plurality of Experiences (tracks 80A to 80N) are used as the input to the Mixing Function 110 and Mixing Renderer 120 to create "atmospheric ambience" that changes randomly, heuristically, or by optional External Input control system 115.

In the example of FIG. 3, the External Input 115 comes from the actions in a video game where the player is wandering through a Forest Experience, then into a Swamp Experience, and finally ends up at the Beach Experience. Specifically, when the player is initially in a forest, they will hear forest sounds. As the player moves out of the forest and through a swamp, they will hear less forest sounds and more swamp sounds. Finally, as the player leaves the swamp and emerges at a beach, the swamp sounds fade away and the sounds of the waves and wind at the beach become louder. In this example, the atmospheric ambience changes as the user wanders, matching the user's location within the game world and seamlessly blending between the experiences as the user wanders. In this example, the audio playback clip track comprises audio segments with sounds that correspond to the position of the game player in the virtual world. The optional external input 115 could just as easily be driven by the time of day, the user's own heartbeat, or other metrics that change the ambience in a way that is intended to induce an atmosphere, feeling, relaxation, excitement, etc. It is to be understood that the input into external input 115 is not limited to a game.

The present system can also be used to prepare and export foley tracks for use in games and films and the present system logic may also be incorporated into games and other software packages to generate unique sound atmospheres, or that respond to live dynamic input creating ambient effects that correspond to real or simulated events, or that create entirely artistic renditions.

What is claimed is:

1. A method of mixing audio segments from a plurality of audio source clips to generate a sound stream, comprising:
   (a) inputting the plurality of audio source clips;
   (b) selecting a plurality of audio segments from the plurality of audio source clips, wherein the plurality of selected audio segments have unequal lengths;
   (c) arranging the selected audio segments into an order and cross-fading the plurality of selected audio segments to form the sound stream having transitions from one selected audio segment to another that are seamless, wherein cross-fades between the plurality of selected audio segments have unequal durations; and then
   (d) playing back the sound stream while adding newly selected audio segments to the sound stream.

2. The method of claim 1, further comprising:
   inputting a plurality of the sound streams;
   selecting playback times for the plurality of inputted sound streams;
   generating a plurality of audio tracks from the plurality of inputted sound streams;
   cross-fading the selected plurality of audio tracks; and
   playing the plurality of audio tracks.

3. The method of claim 2, wherein the user suspends the playback of any of the plurality of audio tracks.

4. The method of claim 2, further comprising:
   inputting a plurality of the audio tracks;
   selecting playback conditions for the plurality of audio tracks;
   cross-fading the plurality of audio tracks with the playback conditions that have been met, thereby generating an audio experience that corresponds to the selected playback conditions; and
   playing the audio experience.

5. The method of claim 4, wherein the selected playback conditions correspond to game logic.

6. The method of claim 5, wherein the game logic is determined by game player activity comprising moving through a virtual world such that the audio experience comprises sounds that correspond to a position of a game player in the virtual world.

\* \* \* \* \*